United States Patent
McGrath et al.

(10) Patent No.: US 6,442,707 B1
(45) Date of Patent: Aug. 27, 2002

(54) ALTERNATE FAULT HANDLER

(75) Inventors: Kevin J. McGrath, Los Gatos, CA (US); Michael T. Clark; Scott A. White, both of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/430,120

(22) Filed: Oct. 29, 1999

(51) Int. Cl.$^7$ .............................. H02H 3/05; G06F 15/00
(52) U.S. Cl. ............................ 714/10; 714/23; 712/244
(58) Field of Search .............................. 714/10, 23, 34; 712/244; 710/268, 266, 265, 260

(56) References Cited

U.S. PATENT DOCUMENTS

| | | |
|---|---|---|
| 4,044,338 A | 8/1977 | Wolf |
| 4,453,212 A | 6/1984 | Gaither et al. |
| 4,807,115 A | 2/1989 | Torng |
| 4,807,857 A | 2/1989 | Wolf et al. |
| 4,857,612 A | 8/1989 | Bacskai |
| 4,858,105 A | 8/1989 | Kuriyama et al. |
| 4,928,223 A | 5/1990 | Dao et al. |
| 5,053,631 A | 10/1991 | Perlman et al. |
| 5,058,048 A | 10/1991 | Gupta et al. |
| 5,129,067 A | 7/1992 | Johnson |
| 5,136,697 A | 8/1992 | Johnson |

(List continued on next page.)

FOREIGN PATENT DOCUMENTS

| | | |
|---|---|---|
| EP | 259095 | 3/1988 |
| EP | 381471 | 8/1990 |
| EP | 0651320 | 5/1995 |
| GB | 459232 | 12/1991 |
| GB | 2263985 | 8/1993 |
| GB | 2263987 | 8/1993 |
| GB | 2281422 | 3/1995 |

OTHER PUBLICATIONS

Mike Johnson, "Superscalar Microprocessor Design," AMD, Jan. 24, 1994, pp. 71–75.

Intel, "Pentium Processor User's Manual," vol. 3, Architecture and Programming Manual, 1993, 7 pages.

Intel, "Pentium Processor Family User's Manual", vol. 1, Pentium Processor Family Data Book, 1994, 6 pages.

Michael Slater, "AMD's K5 Designed to Outrun Pentium," Microprocessor Report, Oct. 24, 1994, MicroDesign Resources, 7 pages.

Sebastian Rupley and John Clyman, "P6: The Next Step?," PC Magazine, Sep. 12, 1995, 16 pages.

Tom R. Halfhill, "AMD K6 Takes On Intell P6," Jan. 1996, 4 pages.

*Primary Examiner*—Robert Beausoleil
*Assistant Examiner*—Marc Duncan
(74) *Attorney, Agent, or Firm*—Conley, Rose & Tayon, PC; Robert C. Kowert

(57) ABSTRACT

In a processor a reorder buffer maintains a load/store (LS) fault address register (LSFAR). When the processor's load/store unit reports most LS exceptions, the reorder buffer redirects the microcode unit of the processor to execute a fault handler indicated by an address stored in the LSFAR. The LSFAR may be mapped into the register space of the processor. It may be written by a microcode routine with the address of a specific fault handler at the beginning of a microcode routine or at any time during a microcode routine. As the reorder buffer retires instructions it checks for writes to the LSFAR. If one exists, the reorder buffer loads the result data of that write into the LSFAR. In a preferred embodiment the reorder buffer retires instructions in program order and the LSFAR is not updated speculatively. Also, in a preferred embodiment, when a microcode routine exits, the LSFAR is automatically returned to a default value which indicates a generic fault handling routine.

46 Claims, 10 Drawing Sheets

U.S. PATENT DOCUMENTS

| | | |
|---|---|---|
| 5,226,126 A | 7/1993 | McGarland et al. |
| 5,226,130 A | 7/1993 | Favor et al. |
| 5,299,318 A | 3/1994 | Bernard et al. |
| 5,305,455 A * | 4/1994 | Anschuetz et al. ......... 709/100 |
| 5,371,884 A * | 12/1994 | Ross ........................... 714/10 |
| 5,442,760 A | 8/1995 | Rustad et al. |
| 5,515,538 A | 5/1996 | Kleiman |
| 5,537,629 A | 7/1996 | Brown et al. |
| 5,596,733 A * | 1/1997 | Worley et al. .............. 712/244 |
| 5,623,619 A | 4/1997 | Witt |
| 5,630,083 A | 5/1997 | Carbine et al. |
| 5,689,672 A | 11/1997 | Witt et al. |
| 5,752,259 A | 5/1998 | Tran |
| 5,764,971 A * | 6/1998 | Shang et al. .................. 712/23 |
| 5,796,973 A | 8/1998 | Witt et al. |
| 5,845,102 A | 12/1998 | Miller et al. |
| 5,920,710 A | 7/1999 | Tran et al. |
| 5,933,629 A | 8/1999 | Mahalingaiah et al. |
| 6,009,513 A | 12/1999 | Mahalingaiah et al. |
| 6,128,687 A * | 10/2000 | Dao et al. .................... 370/382 |
| 6,189,093 B1 * | 2/2001 | Ekner et al. ................ 710/260 |
| 6,192,468 B1 | 2/2001 | Mahalingaiah et al. |
| 6,289,446 B1 * | 9/2001 | Nilsson ...................... 712/242 |

ALTERNATE FAULT HANDLER

BACKGROUND OF THE INVENTION

1. Field of the Invention

This invention is related to the field of processors and, more particularly, to exception handling within processors.

2. Description of the Related Art

Microprocessor designers often design their products in accordance with the x86 microprocessor architecture in order to take advantage of its widespread acceptance in the computer industry. Because the x86 microprocessor architecture is pervasive, many computer programs are written in accordance with the architecture. X86 compatible microprocessors may execute these computer programs, thereby becoming more attractive to computer system designers who desire x86-capable computer systems. Such computer systems are often well received within the industry due to the wide range of available computer programs.

The x86 microprocessor architecture specifies a variable length instruction set (i.e. an instruction set in which various instructions employ differing numbers of bytes to specify that instruction). For example, the 80386 and later versions of x86 microprocessors employ between 1 and 15 bytes to specify a particular instruction. Instructions have an opcode, which may be 1–2 bytes, and additional bytes may be added to specify addressing modes, operands, and additional details regarding the instruction to be executed. Certain instructions within the x86 instruction set are quite complex, specifying multiple operations to be performed. For example, the PUSHA instruction specifies that each of the x86 registers be pushed onto a stack defined by the value in the ESP register. The corresponding operations are a store operation for each register, and decrements of the ESP register between each store operation to generate the address for the next store operation.

Often, complex instructions are classified as MROM instructions. MROM instructions are transmitted to a microcode unit within the microprocessor, which decodes the complex MROM instruction and produces two or more simpler microcode instructions for execution by the microprocessor. The simpler microcode instructions corresponding to the MROM instruction are typically stored in a read-only memory (ROM) within the microcode unit. The microcode unit determines an address within the ROM at which the microcode instructions are stored, and transfers the microcode instructions out of the ROM beginning at that address. Multiple clock cycles may be used to transfer the entire set of instructions within the ROM that correspond to the MROM instruction. Different instructions may require differing numbers of microcode instructions to effectuate their corresponding functions. Additionally, the number of microcode instructions corresponding to a particular MROM instruction may vary according to the addressing mode of the instruction, the operand values, and/or the options included with the instruction. The microcode unit issues the microcode instructions into the instruction processing pipeline of the microprocessor. The microcode instructions are thereafter executed in a similar fashion to other instructions. It is noted that the microcode instructions may be instructions defined within the instruction set, or may be custom instructions defined for the particular microprocessor. Of course the use of microcode is not limited to x86 microprocessors. Many different types of microprocessors employ microcode units.

Conversely, less complex instructions are decoded by hardware decode units within the microprocessor, without intervention by the microcode unit. The terms "directly-decoded instruction" and "fastpath instruction" will be used herein to refer to instructions which are decoded and executed by the microprocessor without the aid of a microcode unit. As opposed to MROM instructions which are reduced to simpler instructions which may be handled by the microprocessor, directly-decoded instructions are decoded and executed via hardware decode and functional units included within the microprocessor.

Another use of microcode is in exception handling. An exception may occur in a processor when the processor is unable to complete an instruction. For example, an exception may be generated from a divide instruction when the divisor is zero. Also, an exception may be generated if an invalid opcode is detected by the execution unit. Other type of exceptions may occur from memory operations. The term "memory operation" is an operation which specifies a transfer of data between a processor and memory (although the transfer may be accomplished in cache). Load memory operations specify a transfer of data from memory to the processor, and store memory operations specify a transfer of data from the processor to memory. Load memory operations may be referred to herein more succinctly as "loads", and similarly store memory operations may be referred to as "stores". Memory operations may be implicit within an instruction which directly accesses a memory operand to perform its defined function (e.g. arithmetic, logic, etc.), or may be an explicit instruction which performs the data transfer only, depending upon the instruction set employed by the processor. Generally, memory operations specify the affected memory location via an address generated from one or more operands of the memory operation. This address will be referred to herein in as a "data address" generally, or a load address (when the corresponding memory operation is a load) or a store address (when the corresponding memory operation is a store). On the other hand, addresses which locate the instructions themselves within memory are referred to as "instruction addresses".

Exceptions resulting from memory operations may be referred to as load/store exceptions. An example of such an exception is a page fault which occurs if when translating a linear address to a physical address, the processor determines that the page containing the operand is not present in physical memory. Typically, when an exception occurs, control may be transferred to a microcode routine to handle the exception. For example, for a page fault the exception handling routine may perform certain architecturally required tasks and then pass control to software (e.g., the operating system) to load the missing page into memory. Execution may then return to the instruction from which the page fault occurred.

An exception, such as a load/store exception, may occur during execution of an MROM instruction. For example, during: the execution of the microcode routine that implements an MROM instruction, a page fault may occur. The exception will cause the processor to be redirected to the exception handler (which is typically a microcode routine). Typically, the microcode fault handler must initially perform certain clean-up operations before an exception can be handled. For example, the MROM instruction routine that was interrupted by the exception may have left the processor state in a partially completed state. It may be necessary for the exception handler to "clean up" the processor state before the exception handling can continue. Just what sort of clean up is required depends upon the context in which the exception occurred. Depending on what MROM routine was interrupted or at what point a routine was interrupted, different clean-up may be required. Thus, the exception handler must determine the context in which the exception occurred.

Turning now to FIG. 1, a prior art example of how an exception handler may determine the context in which an exception occurred. There exist some number of microcode routines (labeled A through D in the example of FIG. 1). Each of these routines alter macro-architectural state (visible to the programmer) or micro-architectural state (internal to the processor). Further, each of these routines can be prematurely terminated by an exception or interrupt before they complete. Exceptions/Interrupts transfer control to the microcode's generic exception processing routine (labeled 'X'). The exception processing microcode implements the architecturally required elements of exception handling (e.g. building a stack frame, transferring control to find the software handler for this exception). But before doing that, it is usually necessary to correct or fixup some of the previously mentioned macro- or micro-architectural state that was left in a partially completed state. This fixup may include undoing some or all of the state changes of the interrupted routine, altering CPU state to reflect the progress of the interrupted routine, etc. The precise fixup action is specific to which routine was interrupted and possibly where in the routine the exception or interrupt occurred. Thus many different fixup routines may need to be included within the generic exception processing routine. In the example of FIG. 1, in order for the microcode generic exception processing routine ('X') to run the correct fixup routine, microcode maintains a flag (labeled $F_A$ through $F_D$) for each original routine. This flag must be set before any routine can take an interrupt and just as importantly, they must be cleared if no exceptions take place. These flags are then tested in the exception handler to determine which routine was interrupted and hence which fixup routine needs to be run. Maintaining and testing these flags requires additional microcode space and complexity. Thus, it may be desirable to improve how context-related clean-up is performed for exceptions in order to reduce the complexity and/or improve the efficiency of generic microcode exception processing routines.

One prior art processor has attempted to improve fault handling by providing registers in the processor's microcode unit that can be used to specify the address of an alternate fault handler and a default fault handler in the microcode. This mechanism employs a first register to specify the alternate fault handler microcode ROM address, a second register to specify the default fault: handler address, a multiplexor to provide the contents of one of the registers to the microcode engine, and a third register to specify which of the first two registers should be selected by the multiplexor. The first, second, and third registers are special registers that are not part of the processor's regular register address space. Accordingly, special microcode instructions are provided whose sole purpose is to program these registers. A microcode routine may use one of these special microcode instructions to write to these special registers to enable an alternate fault handler. If an exception occurs after the alternate fault handler is enabled, the specified alternate fault handler may perform any necessary clean-up operations before jumping to the regular (default) fault handler. When it is no longer desired to have the alternate fault handler enabled, such as when exiting a microcode routine, the special microcode instructions must be used to write to these special registers to disable the alternate fault handler and enable the default fault handler. Thus, this mechanism is somewhat complex and cumbersome. Multiple registers and other hardware is required for the mechanism. Also, special microcode instructions must be added to the microcode instruction set in order to program the registers. Additionally, multiple register writes are required to enable and disable alternate fault handlers. Thus, an improved alternate fault handler mechanism is desirable.

SUMMARY OF THE INVENTION

Instead of executing one generic exception handler, when an exception is received, such as a load/store exception, alternate fault handler routines may be executed depending upon the context in which the exception is received. By executing an alternate fault handler from microcode based on the context of the exception, the microcode may restore state, change the fault type, or change error codes before jumping to the generic fault handler if necessary. The use of alternate fault handlers may simplify both the microcode and hardware by eliminating or reducing the need to determine the context in which an exception occurred.

In one embodiment a reorder buffer maintains a load/store (LS) fault address register (LSFAR). When the processor's load/store unit reports most LS exceptions, the reorder buffer redirects the microcode unit of the processor to execute a fault handler indicated by an address stored in the LSFAR. The LSFAR may be mapped into the register space of the processor. It may be written by a microcode routine with the address of a specific fault handler at the beginning of a microcode routine or at any time during a microcode routine. As the reorder buffer retires instructions it checks for writes to the LSFAR. If one exists, the reorder buffer loads the result data of that write into the LSFAR. In a preferred embodiment the reorder buffer retires instructions in program order and the LSFAR is not updated speculatively.

Once a value is written into the LSFAR the fault handler specified by the value is in effect until the LSFAR is updated with a new value. Upon exiting each microcode routine, LSFAR is returned to a default value which may point to the generic fault handler in microcode. LSFAR may also be returned to the default value if the processor receives a reset. However, an abort in which speculative instructions are cancelled in the reorder buffer does not return LSFAR to the default value. Instead, the current LSFAR value is maintained.

Inside each alternate fault handler, microcode exists to do any required clean-up, restoring of state, or changing of fault codes as required for precise exception handling according to the architectural definition of the processor. After performing its fix-ups the alternate fault handler may jump directly to the default exception handler or some other exception entry point.

In one embodiment a processor includes a microcode unit having a microcode memory configured to store microcode routines for implementing microcoded instructions and microcode routines for exception handling. The processor also includes one or more execution units configured to execute the microcode routines and exception logic configured to indicate if an exception occurs during execution of one of the microcode routines. A register, such as the LSFAR, is configured to store a value indicating the location of an exception handling routine in the microcode memory. If an exception occurs during execution of one of the microcode routines, the exception handling routine indicated by that value is executed. The register value may be changed for different ones of the microcode routines to indicate different exception handling routines.

Thus, an alternate fault handler method may include writing a register in the processor with a first value indicating a specific exception handling routine. If an exception is generated while the register contains the first value then the exception handling routine indicated by that value is executed in response to the exception. As the processor context changes, such as during execution of a different microcode routine or a different portion of a microcode routine, the register may be written with a different value indicating a different exception handling routine such that if an exception is generated while the different exception handling routine is indicated by the register then that exception handling routine will be executed in response to an exception. The method includes automatically restoring the register to indicate a default exception handling routine upon exiting a microcode routine.

In one embodiment, a processor may include a register configured to store different values where each different value indicates the location of a different condition handling routine. The processor may also include one or more execution units configured to execute program instructions and logic configured to receive a condition during execution of the program instructions. The logic may cause execution of the program instructions to be interrupted and may cause the condition handling routine indicated by the value stored in the register to be executed to handle a condition that is received while that particular value is stored in the register. The condition may be an exception or an interrupt, for example. The value stored in the register is chosen so that if the condition occurs the value will indicate one of the condition handling routines specific to the context in which the condition occurred.

During execution of a microcode routine an exception handler address register may be loaded with an address of an exception handling routine. If an exception is received after loading the address into the exception handler address register, in response to the exception, a microcode unit of the processor may be redirected to issue microcode instructions for executing the exception handling routine located in microcode memory at a microcode memory address as indicated by the address in the exception handler address register. Different addresses may be loaded in the exception handler address register during the execution of the microcode routine or during execution of other microcode routines. The addresses loaded indicate the microcode address of an exception handling routine stored in the microcode memory specific to the processor context while that address is stored in the exception handler address register. The processor context may refer to the particular microcode routine or portion of a particular microcode routine for which a particular address is loaded in the exception handler address register. Upon exiting microcode routines, the exception handler address register may be automatically restored to indicate the address of a genenric exception handling routine in the microcode memory.

BRIEF DESCRIPTION OF THE DRAWINGS

Other objects and advantages of the invention will become apparent upon reading the following detailed description and upon reference to the accompanying drawings in which.

Figure 1:
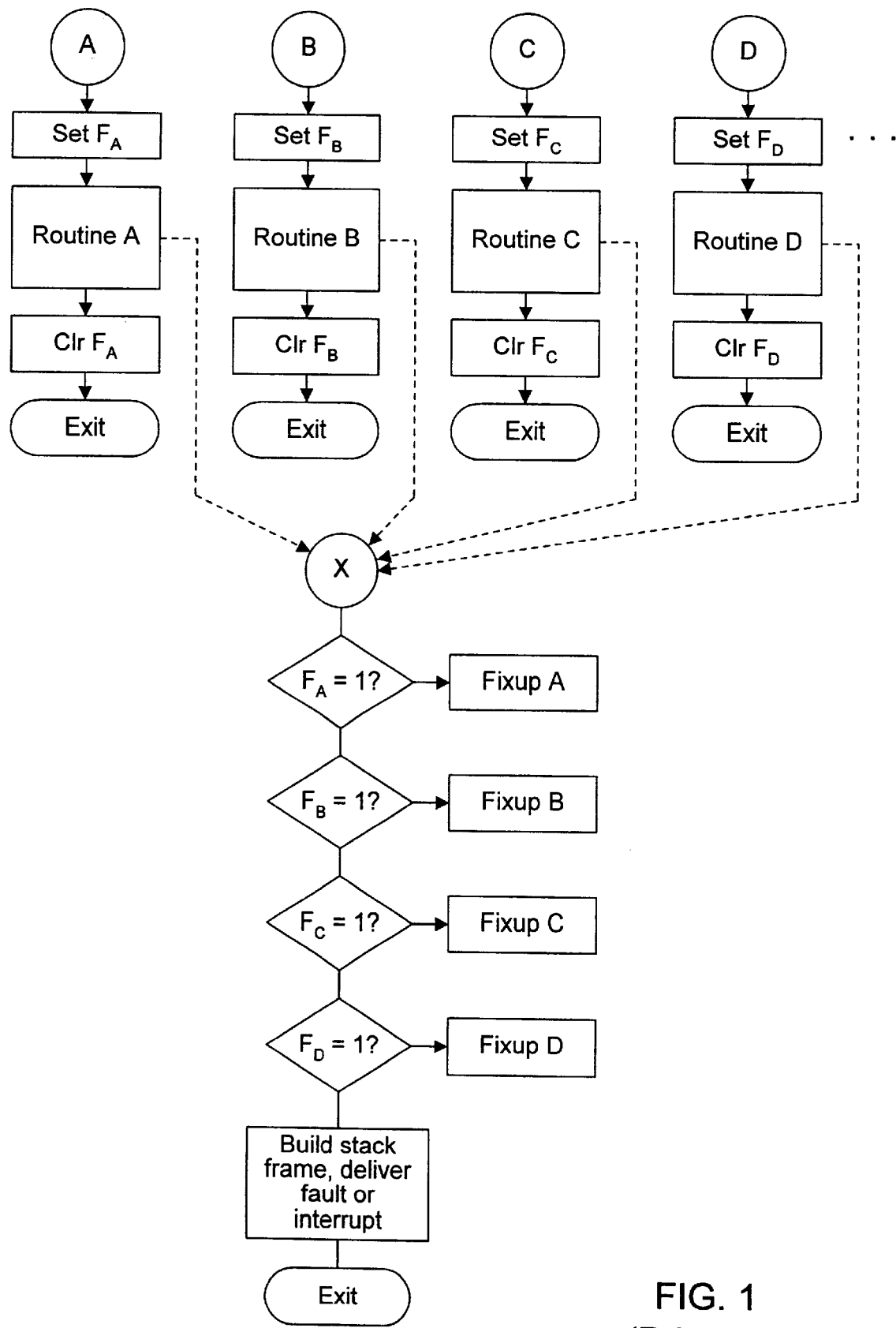
FIG. 1 is a diagram of a conventional fault handling mechanism.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
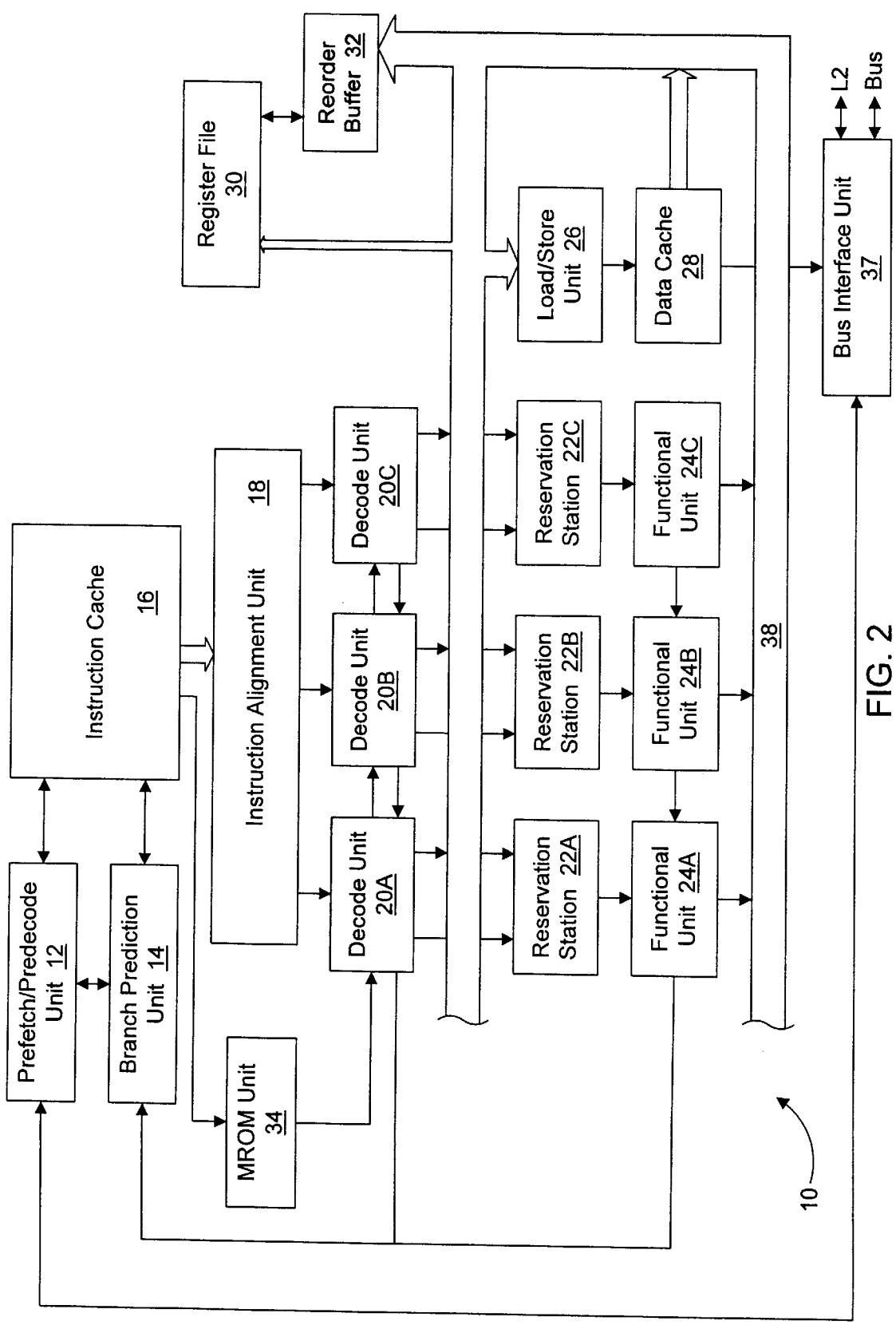
FIG. 2 is a block diagram of one embodiment of a processor.

Turning now to FIG. 2, a block diagram of one embodiment of a processor 10 is shown. Other embodiments are possible and contemplated. As shown in FIG. 2, processor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a bus interface unit 37. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from bus interface unit 37, and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to bus interface unit 37. Bus interface unit 37 is further coupled to an L2 interface to an L2 cache and a bus. Finally, MROM unit 34 is coupled to decode units 20.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2 way set associative structure having 32 byte lines (a byte comprises 8 binary bits). Alternatively, any other desired configuration and size may be employed. For example, it is noted that instruction cache 16 may be implemented as a fully associative, set associative, or direct mapped configuration.

Instructions are stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14. Other embodiments may employ any suitable predecode scheme.

One encoding of the predecode tags for an embodiment of processor 10 employing a variable byte length instruction set will next be described. A variable byte length instruction set is an instruction set in which different instructions may occupy differing numbers of bytes. An exemplary variable byte length instruction set employed by one embodiment of processor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| Start bits | 10000 |
|---|---|
| End bits | 00001 |
| Functional bits | 11000 |

According to one particular embodiment, early identification of an instruction that includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Processor 10 employs branch prediction in order to speculatively fetch instructions subsequent to conditional branch instructions. Branch prediction unit 14 is included to perform branch prediction operations. In one embodiment, branch prediction unit 14 employs a branch target buffer which caches up to two branch target addresses and corresponding taken/not taken predictions per 16 byte portion of a cache line in instruction cache 16. The branch target buffer may, for example, comprise 2048 entries or any other suitable number of entries. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of processor 10. In an alternative configuration, branch prediction unit 14 may be coupled to reorder buffer 32 instead of decode units 20 and functional units 24, and may receive branch misprediction information from reorder buffer 32. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction. In one particular embodiment, each instruction is decoded into up to two operations which may be separately executed by functional units 24A–24C.

Processor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to five pending instructions awaiting issue to the corresponding functional unit. It is noted that for the embodiment of FIG. 2, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position I is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of processor 10 which employ the x86 processor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of processor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case. In embodiments in which instructions may be decoded into multiple operations to be executed by functional units 24, the operations may be scheduled separately from each other.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 or reorder buffer 32 and subsequently communicating with reorder buffer 32 to complete the instructions. Additionally, functional units 24 may be configured to perform address generation for load and store memory operations performed by load/store unit 26. In one particular embodiment, each functional unit 24 may comprise an address generation unit for generating addresses and an execute unit for performing the remaining functions. The two units may operate independently upon different instructions or operations during a clock cycle.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32. It is further noted that branch execution results may be provided by functional units 24 to reorder buffer 32, which may indicate branch mispredictions to functional units 24.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a first load/store buffer having storage locations for data and address information for pending loads or stores which have not accessed data cache 28 and a second load/store buffer having storage locations for data and address information for loads and stores which have access data cache 28. For example, the first buffer may comprise 12 locations and the second buffer may comprise 32 locations. Decode units 20 arbitrate for access to the load/store unit 26. When the first buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between processor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 processor architecture.

Data cache 28 is a high speed cache memory provided to temporarily store data being transferred between load/store unit 26 and the main memory subsystem. In one embodiment, data cache 28 has a capacity of storing up to 64 kilobytes of data in an two way set associative structure. It is understood that data cache 28 may be implemented in a variety of specific memory configurations, including a set associative configuration, a fully associative configuration, a direct-mapped configuration, and any suitable size of any other configuration.

In one particular embodiment of processor 10 employing the x86 processor architecture, instruction cache 16 and data cache 28 are linearly addressed and physically tagged. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. The physical address is compared to the physical tags to determine a hit/miss status.

Bus interface unit 37 is configured to communicate between processor 10 and other components in a computer system via a bus. For example, the bus may be compatible with the EV-6 bus developed by Digital Equipment Corporation. Alternatively, any suitable interconnect structure may be used including packet-based, unidirectional or bi-directional links, etc. An optional L2 cache interface may be employed as well for interfacing to a level two cache.

Figure 3:
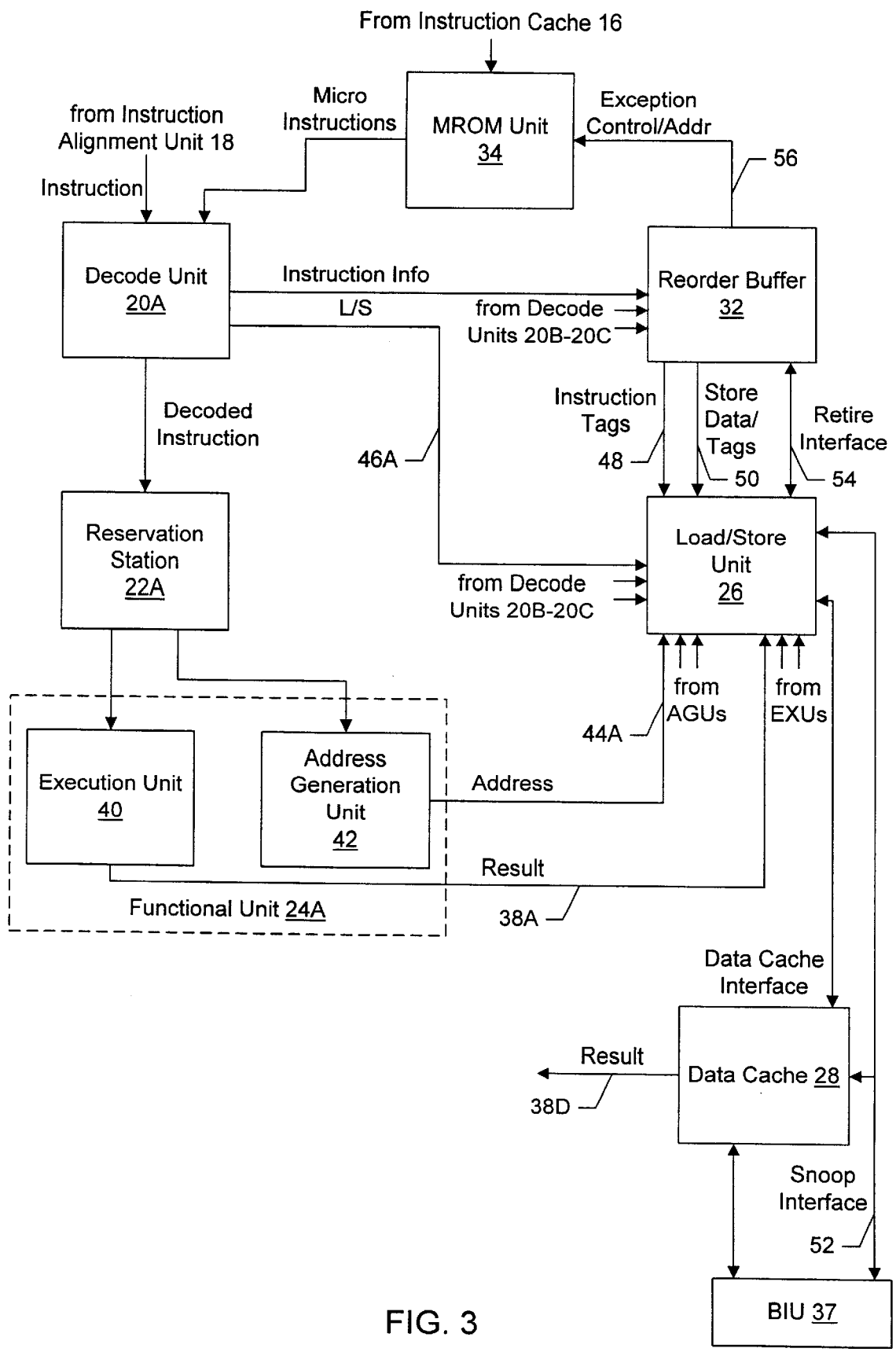
FIG. 3 is a block diagram of one embodiment of a decode unit, a reservation station, a functional unit, a reorder buffer, an MROM unit, a load/store unit, a data cache, and a bus interface unit shown in FIG. 2.

A more detailed discussion of certain components of processor 10 is next provided. Other embodiments are possible and contemplated. FIG. 3 illustrates load/store unit 26, reorder buffer 32, MROM unit 34, data cache 28, bus interface unit (BIU) 37, decode unit 20A, reservation station 22A, and functional unit 24A to highlight certain interconnection therebetween according to one embodiment of processor 10. Other embodiments may employ additional, alternative, or substitute interconnect as desired. Interconnect between decode units 20B–20C, reservation stations 22B–22C, functional units 24B–24C, and other units shown in FIG. 2 may be similar to that shown in FIG. 3.

Decode unit 20A receives an instruction from instruction alignment unit 18 or MROM unit 34 and decodes the instruction. Decode unit 20A provides the decoded instruction to reservation station 22A, which stores the decoded instruction until the instruction is selected for execution. Additionally, if the instruction specifies a load or store memory operation, decode unit 20A signals load/store unit 26 via L/S lines 46A. Similar signals from decode units 20B–20C may be received by load/store unit 26 as well. L/S lines 46A indicate whether a load memory operation, a store memory operation, or both are specified by the instruction being decoded. For example, L/S lines 46A may comprise a load line and a store line. If no memory operation is specified, then signals on both lines are deasserted. The signal on the load line is asserted if a load memory operation is specified, and similarly the signal on the store line is asserted if a store memory operation is specified. Both signals are asserted if both a load memory operation and a store memory operation are specified. In response to signals on L/S lines 46A, load/store unit 26 allocates an entry in a load/store buffer included therein to store the corresponding memory operation.

In addition to the above, decode unit 20A provides information to reorder buffer 32 about the instruction being decoded. Reorder buffer 32 receives the information (as well as similar information from other decode units 20B–20C) and allocates reorder buffer entries in response thereto. The allocated reorder buffer entries are identified by reorder buffer tags, which are transmitted to load/store unit 26 upon an instruction tags bus 48. Instruction tags bus 48 may be configured to transmit a tag for each possible instruction (e.g. three in the present embodiment, one from each of decode units 20A–20C). Alternatively, in an embodiment employing the line-oriented structure described above, reorder buffer 32 may be configured to transmit a line tag for the line, and load/store unit 26 may augment the line tag with the offset tag of the issue position which is signaling a particular load or store.

Reorder buffer 32 is further configured to perform dependency checking for register operands of the instruction. The register operands are identified in the instruction information transmitted by decode units 20. For store memory operations, the store data is a source operand which load/store unit 26 receives in addition to the store address. Accordingly, reorder buffer 32 determines the instruction which generates the store data for each store memory operation and conveys either the store data (if it is available within reorder buffer 32 or register file 30 upon dispatch of the store memory operation) or a store data tag for the store data on a store data/tags bus 50. If the instruction corresponding to the store memory operation is an explicit store instruction which stores the contents of a register to memory, the instruction tag of the instruction which generates the store data (or the store data, if it is available) is conveyed. On the other hand, the instruction itself generates the store data if the instruction includes the store memory operation as an implicit operation. In such cases, reorder buffer 32 provides the instruction tag of the instruction as the store data tag.

Although not illustrated in FIG. 3 for simplicity in the drawing, reservation station 22A receives operand tags and/or data for the instruction from reorder buffer 32 as well. Reservation station 22A captures the operand tags and/or data and awaits delivery of any remaining operand data (identified by the operand tags) from result buses 38. Once an instruction has received its operands, it is eligible for execution by functional unit 24A. More particularly, in the embodiment shown, functional unit 24A includes an execution unit (EXU) 40 and an address generation unit (AGU) 42. Execution unit 40 performs instruction operations (e.g. arithmetic and logic operations) to generate results which are forwarded on result bus 38A (one of result buses 38) to load/store unit 26, reservation stations 22, and reorder buffer 32. AGU 42 generates data addresses for use by a memory operation or operations specified by the instruction, and transmits the data addresses to load/store unit 26 via address bus 44A. It is noted that other embodiments may be employed in which AGU 42 and execution unit 40 share result bus 38A and in which functional unit 24A includes only an execution unit which performs address generation and other instruction execution operations. Load/store unit 26 is further coupled to receive result buses and address buses from the execution units and AGUs within other functional units 24B–24C as well.

Since the embodiment shown employs AGU 42, reservation station 22A may select the address generation portion of an instruction for execution by AGU 42 once the operands used to form the address have been received but prior to receiving any additional operands the instruction may have. AGU 42 transmits the generated address to load/store unit 26 on address bus 44A, along with the instruction tag of the instruction for which the data address is generated. Accordingly, load/store unit 26 may compare the tag received on address bus 44A to the instruction tags stored in the load/store buffer to determine which load or store the data address corresponds to.

Load/store unit 26 monitors the result tags provided on result buses 38 to capture store data for store memory operations. If the result tags match a store data tag within load/store unit 26, load/store unit 26 captures the corresponding data and associates the data with the corresponding store instruction.

Load/store unit 26 is coupled to data cache 28 via a data cache interface. Load/store unit 26 selects memory operations to probe data cache 28 via the data cache interface, and receives probe results from the data cache interface. Generally speaking, a "probe" of the data cache for a particular memory operation comprises transmitting the data address of the particular memory operation to data cache 28 for data cache 28 to determine if the data address hits therein. Data cache 28 returns a probe result (e.g. a hit/miss indication) to load/store unit 26. In addition, if the particular memory operation is a load and hits, data cache 28 forwards the corresponding load data on a result bus 38D to reservation stations 22, reorder buffer 32, and load/store unit 26. In one embodiment, data cache 28 includes two ports and may thus receive up to 2 probes concurrently. Data cache 28 may, for example, employ a banked configuration in which cache lines are stored across at least two banks and two probes may be serviced concurrently as long as they access different banks. In one particular embodiment, data cache 28 may employ 8 banks.

Data cache 28 is configured to allocate cache lines in response to probes that miss, and communicates with bus interface unit 37 to fetch the missing cache lines. Additionally, data cache 28 transmits evicted cache lines which have been modified to bus interface unit 37 for updating main memory.

Bus interface unit 37 is coupled to data cache 28 and load/store unit 26 via a snoop interface 52 as well. Snoop interface 52 may be used by bus interface unit 37 to determine if coherency activity needs to be performed in response to a snoop operation received from the bus. Generally, a "snoop operation" is an operation performed upon a bus for the purpose of maintaining memory coherency with respect to caches connected to the bus (e.g. within processors). When coherency is properly maintained, a copy of data corresponding to a particular memory location and stored in one of the caches is consistent with the copies stored in each other cache. The snoop operation may be an explicit operation, or may be an implicit part of an operation performed to the address of the particular memory location. Generally, the snoop operation specifies the address to be snooped (the "snoop address") and the desired state of the cache line if the address is stored in the cache. Bus interface unit transmits a snoop request via snoop interface 52 to data cache 28 and load/store unit 26 to perform the snoop operation.

Recorder buffer 32 manages the retirement of instructions. Reorder buffer 32 communicates with load/store unit 26 via retire interface 54 to identify instructions either being retired or ready for retirement. For example, in one embodiment stores do not update data cache 28 (or main memory) until they are retired. Additionally, certain load instructions may be restricted to be performed non-speculatively. Reorder buffer 32 may indicate memory operations which are retired or retireable to load/store unit 26 via retirement interface 54. Accordingly, the instruction information provided by decode units 20 to reorder buffer 32 for each instruction may include an indication of whether or not the instruction includes a load or store operation. Load/store unit 26 may return an acknowledgment to reorder buffer 32 that a particular memory operation is logged as retired, and reorder buffer 32 may subsequently retire the corresponding instruction.

Since the load/store buffer may become full at times, load/store unit 26 may employ a flow control mechanism to stall subsequent memory operations at decode units 20 until sufficient entries are freed (via completion of earlier memory operations) within the load/store buffer for the subsequent memory operations. For example, load/store unit 26 may broadcast a count of the number of free entries to decode units 20, which may stall if the count indicates that insufficient entries are available for the memory operations of instructions being decoded. According to one particular embodiment, the instructions being concurrently decoded by decode units 20 move to reservation stations 22 in lockstep (so that a line may be allocated in reorder buffer 32 for the instructions, as described above with respect to FIG. 2). In such an embodiment, decode units 20 may stall until sufficient entries are available for all memory operations within the set of concurrently decoded instructions. Alternatively, load/store unit 26 may employ a stall signal for stalling subsequent memory operations until buffer entries are available. Any suitable flow control mechanism may be used.

Load/store unit 26 may also communicate load/store (LS) exception information to reorder buffer 32 via retirement interface 54. When reorder buffer 32 indicates to load/store unit 26 that an instruction is ready for retirement, if load/store unit 26 has detected an LS exception, such as a page fault, it communicates the exception to reorder buffer 32 via retirement interface 54 instead of acknowledging the retirement. In an alternate embodiment, load/store unit 26 may indicate LS exceptions before retirement by setting an exception bit or bits in the reorder buffer entry that corresponds to the instruction that caused the exception.

Reorder buffer 32 redirects MROM unit 34 via exception control interface 56 to begin the proper fault handler microcode routine(s) to handle the exception. Reorder buffer 32 supplies a microcode address to MROM unit 34 indicating the beginning of a fault handler in the microcode ROM. As will be explained in more detail below, reorder buffer 32 may provide a different fault handler address depending upon the context of the exception. By providing an address specific to the context of the exception, an alternate fault handler for the particular exception context may be executed from MROM unit 34.

Figure 4:
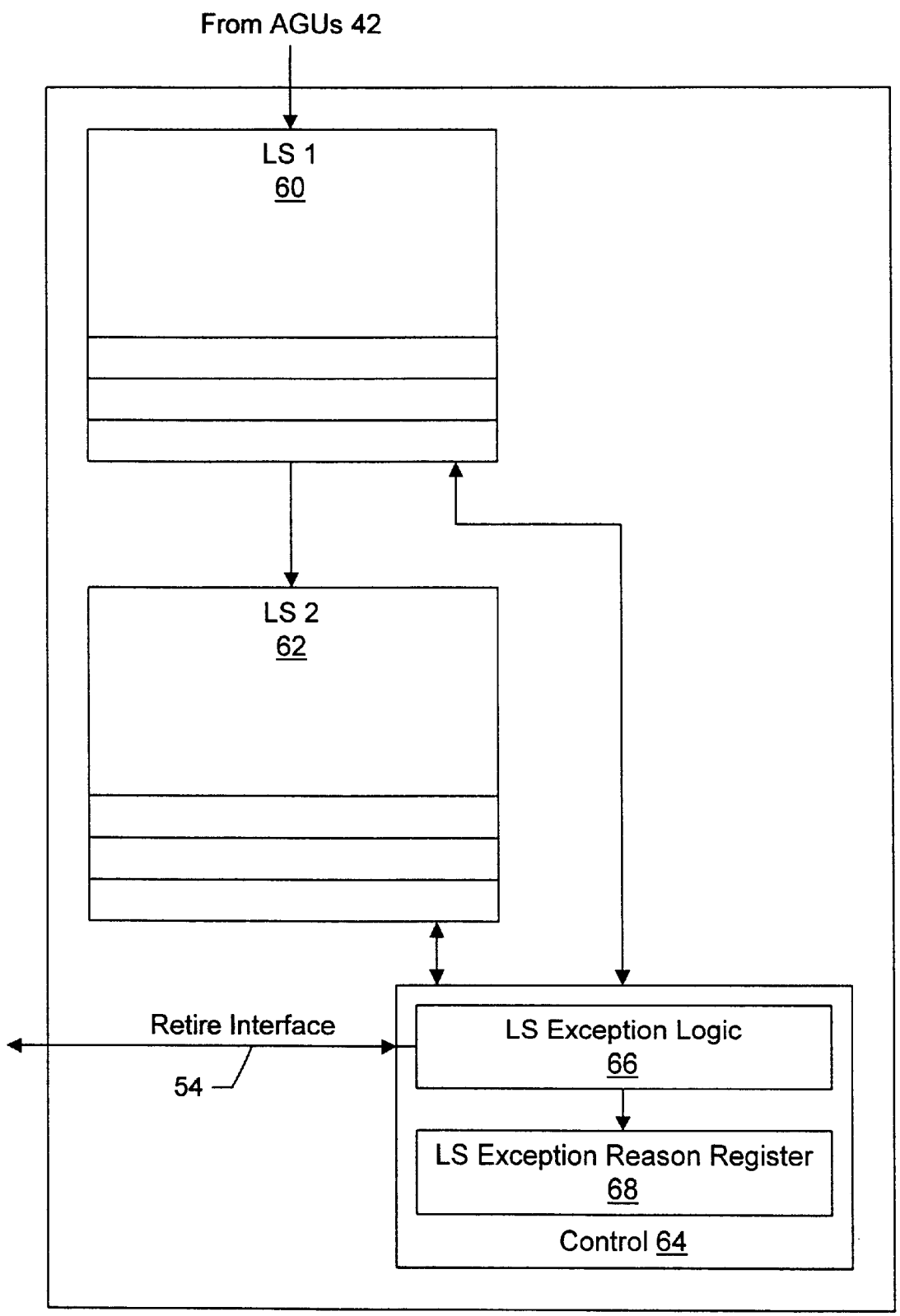
FIG. 4 is a block diagram of one embodiment of a load/store unit.

Turning now to FIG. 4, a simplified block diagram of one embodiment of load/store unit 26 is shown. Other embodiments are possible and contemplated. In the embodiment of FIG. 4, load/store unit 26 includes a first load/store buffer (LS1 buffer) 60, a second load/store buffer (LS2 buffer) 62, and an LS control logic 64 including LS exception logic 66 and LS exception reason register 68. Generally speaking, load/store unit 26 includes a pre-cache buffer (LS1 buffer 60) and a post-cache buffer (LS2 buffer 62). Memory operations are allocated into LS1 buffer 60 upon dispatch within processor 10, and remain within LS1 buffer 60 until selected to probe data cache 28. Subsequent to probing data cache 28, the memory operations are moved to LS2 buffer 62 independent of the probe status (e.g. hit/miss, etc.). Since LS1 buffer 60 stores memory operations which have yet to probe data cache 28 and the memory operations are removed from LS1 buffer 60 upon probing data cache 28, a relatively simple scanning scheme may be used to select memory operations to probe data cache 28. Since the scheme is simple, it may be performed rapidly and may aid in keeping load latency low for loads which hit data cache 28. Additionally, since memory operations are deleted from LS1 after probing data cache 28, the size (i.e. number of entries) of LS1 buffer 60 may be relatively small as compared to the total number of memory operations which may be in-flight.

Memory operations which miss may subsequently be selected to reprobe data cache 28. The term "reprobe", as used herein, refers to probing a cache for a second or subsequent attempt after the first probe for a particular memory operation. Additionally, store memory operations may be held in LS2 buffer 62 until the stores are in condition for retirement. LS2 buffer 62 may be made deeper than LS1 buffer 60, allowing for large numbers of misses to be stored therein. Since, in many cases, memory operations accessing the same cache line tend to be near each other in an instruction stream, a relatively large number of misses to the same cache line may be queued in LS2 buffer 62. Subsequent memory operations which hit data cache 28 may then be selected from LS1 buffer 60 and serviced. Average cache bandwidth may thereby be increased. Furthermore, by allowing the queuing of numerous cache misses in LS2, it may be possible in many cases to keep bus interface unit 37 busy servicing numerous cache line fetch requests from data cache 28, thereby maximizing use of external bus bandwidth.

Note that for ease of illustration, specific details of and connections to load/store unit 26 are not shown in FIG. 4. For a more detailed discussion of a load/store unit such as load/store unit 26, refer to U.S. patent application Ser. No. 09/314,035 entitled "Load/Store Unit Having Pre-Cache and Post-Cache Queues for Low Latency Load Memory Operations" filed May 18, 1999, which is hereby incorporated by reference in its entirety.

LS control logic 64 controls the operation of LS1 buffer 60 and LS2 buffer 62. Additionally, LS control logic may include LS exception logic 66 and LS exception reason register 68. LS exception logic 66 determines if a LS exception (fault) exists for each LS instruction. For example, a load instruction that indicates an address from a segment or page not present in memory will generate an exception. Examples of LS exceptions include page fault, access violation, limit violation, segment not present, protection violation, alignment check, and stack exception. Generally, any kind of fault that could result from a memory access or result from loading a segment register may be considered an LS exception. LS exception logic 66 may receive input from other processor components, such as a translation look-aside buffer associated with data cache 28, in order to determine is an LS exception exists for a particular LS instruction.

LS exception logic 66 indicates LS exceptions to reorder buffer 32 via retirement interface 54. LS exception logic 66 also maintains LS exception reason register 68. LS exception reason register 68 contains the fault code that identifies the type of the LS exception (general protection fault, page fault, limit violation, etc.) that occurred. LS exception reason register is updated by LS: exception logic 66 when an LS exception occurs. LS exception reason register may also be written by an alternate fault handler as described below to change the fault type indicated by the LS exception reason register if necessary. This may allow a more simple hardware implementation for LS exception logic 66. A generic microcode exception handler may read LS exception reason register 68 in order to determine what kind of error exception happened and hence what kind of fault to report to software (e.g. to the x86 level).

Figure 5:
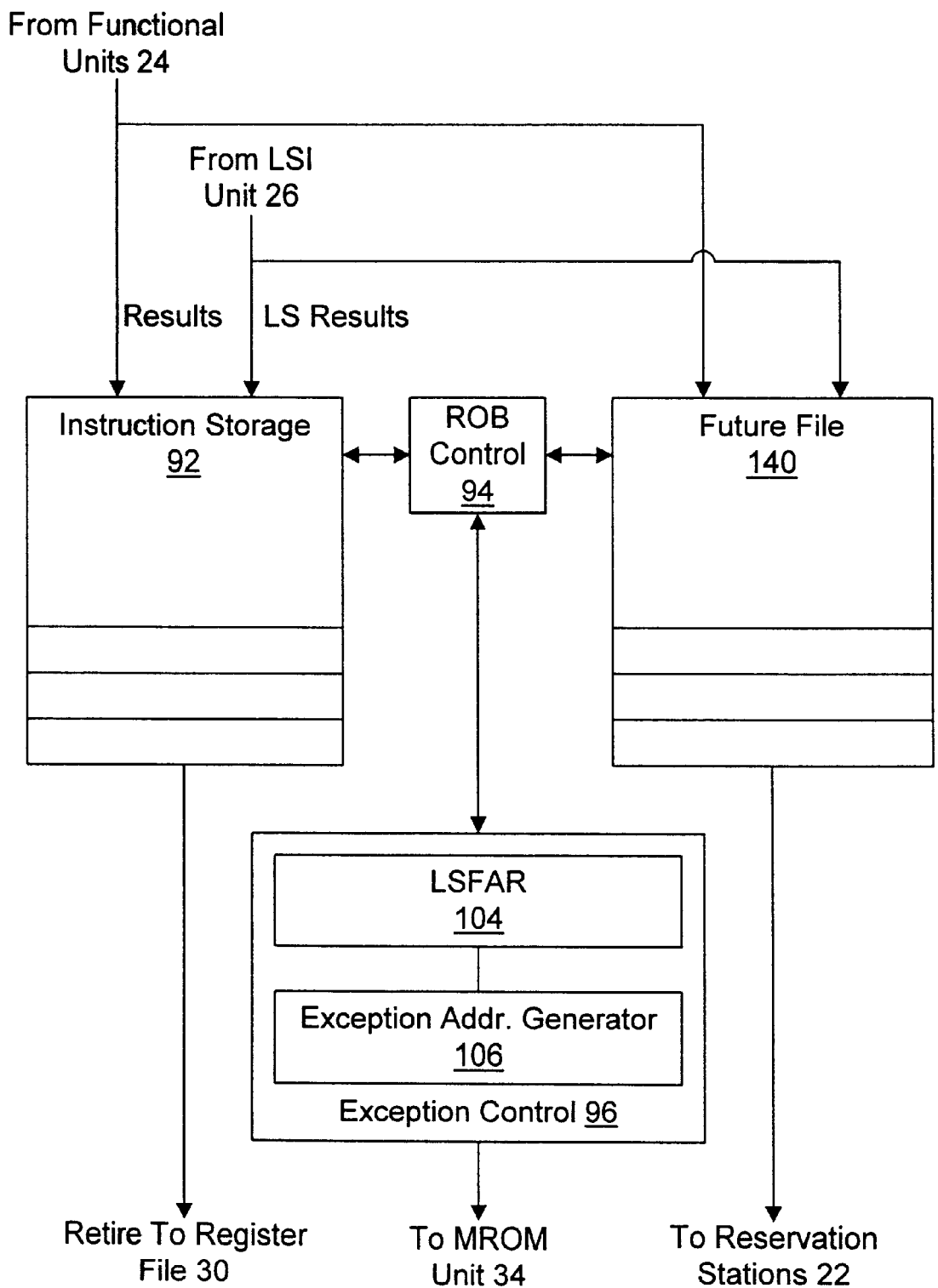
FIG. 5 is a block diagram of one embodiment of a reorder buffer.

Turning now to FIG. 5, a simplified block diagram of part of reorder buffer 32 is shown for one embodiment. Other embodiments are contemplated as well. Upon receipt of at least one valid instruction from decode units 20, ROB control unit 94 allocates a line of storage within instruction storage 92. Instruction storage 92 includes multiple lines of storage. The instruction information received is stored into the line of storage, as well as an indication of the destination operand of the instruction. Information for multiple concurrent instructions may be stored on one line. ROB control unit 94 provides a line tag identifying the allocated line of storage to reservation stations 22. Reservation stations 22 may thereby identify the line of storage which stores a particular instruction. An offset tag is inherent in the issue position of the receiving reservation station 22A–22C. Instruction results are provided by functional units, while load/store unit 26 provides load memory operation results. ROB control unit 94 examines the reorder buffer tags provided by functional units 24 and load/store unit 26 to determine which lines of storage and which instructions within the lines receive the results.

ROB control unit 94 is configured to retire instructions from instruction storage 92. Generally, the instructions within a line of storage are retired simultaneously. Additionally, instructions are retired in program order. Therefore, ROB control unit 94 monitors the line of storage storing the instruction which is foremost in program order among the instructions within instruction storage 92 (the "oldest line"). When each of the instructions within the oldest line have executed and provided results, the instructions are retired. Instruction results which update register file 30 are conveyed to the register file. The line of storage is then de-allocated, freeing storage space for a set of concurrently dispatched instructions.

Reorder buffer 32 employs a future file 140 to simplify dependency checking. The future file includes a storage location for each many of the registers employed by microprocessor 10. The storage location is updated upon dispatch of an instruction which updates the register, and is further updated upon receipt of the instruction result corresponding to the instruction provided that a subsequent instruction is not dispatched which updates the register. Upon dispatch, the reorder buffer tag identifying the instruction is stored into the future file. Upon receipt of the instruction result, that result is stored into the future file. Therefore, the future file contains information (either reorder buffer tag or instruction result) corresponding to the last instruction (in program order) to update the register. Advantageously, the reorder buffer tag or register value which is to be provided when the register is used as a source operand of an instruction may be read from the corresponding storage location within the future file. It is noted that embodiments of reorder buffer 32 which do not employ a future file are contemplated. For further description of reorder buffers, see U.S. Pat. No. 5,878,244 which is hereby incorporated by reference in its entirety.

Reorder buffer 32 also includes an exception control unit 96. Exception control unit 96 maintains a load/store fault address register (LSFAR) 104 and exception address generator 106. LSFAR 104 stores address information to locate a microcode routine in the MROM to handle an exception. When an exception occurs, exception address generator 106 reads LSFAR 104 and provides an address to MROM unit 34 based on the contents of LSFAR 104. The address locates a specific fault handling routine in the microcode ROM of MROM unit 34. Exception control unit 96 redirects MROM unit 34 to begin the appropriate fault handling routine based on this address. The contents of LSFAR 104 may be changed to allow alternate fault handling routines to be specified. For example, LSFAR 104 may be updated at the beginning of a microcode routine so that if an exception occurs during that routine, MROM unit 34 will begin an exception handler specific to the context in which the exception occurred (i.e. the particular microcode routine). Thus, exceptions may be handled according to the context in which they occurred. As further explained below, this may simplify the overall exception handling. The operation of LSFAR 104 and alternate fault handlers is further described as follows.

An exception may occur during a microcode routine that implements a microcoded instruction. In response to the exception, an exception processing routine may be executed from microcode to implement architecturally required elements of exception handling. But first, it may be necessary to perform certain clean-up or fix-up operations, such as cleaning up the processor state. This may include both processor state visible to software and internal processor state. For example, certain registers may need to be returned to the values they had before the exception occurred. When an exception occurred during a microcode routine the fix-up may include undoing some or all of the state changes of the interrupted routine, or altering processor state to reflect the progress of the interrupted routine, or setting error codes for use in the microcode's exception processing routine, or any other fix-up required to implement precise exceptions. Thus, the necessary fix-up may restore state, change the fault type, change the error code, etc. After the necessary fix-up action is taken a generic exception handler is typically run which implements the architecturally required elements of the exception handling, such as building a stack frame and transferring control to a software handler for the particular exception.

The precise fix-up action is specific to the particular microcode routine that was interrupted by the exception. Thus, there may be different fix-up routines for each microcode routine stored in the microcode ROM. Each one of the different fix-up routines may be referred to as an alternate fault handler. A particular alternate fault handler may be pointed to by LSFAR 104. For example, a particular microcode routine may load the address of its alternate fault handler into LSFAR 104 at the start of the routine. At that time LSFAR 104 is "armed" and any LS faults from that point on would be handled by the alternate fault handler indicated by the contents of LSFAR 104. The contents of LSFAR 104 may be changed during execution of the routine and may automatically be returned to a default value at the end of the routine, i.e. when the microcode routine exits. Note that in some embodiments not all exception faults necessarily use an alternate fault handler specified by LSFAR 104. For example, exception control unit 96 may exempt certain LS exceptions from LSFAR 104 so that certain LS exceptions are handled by the generic fault handler or some other fault handler. Typically this would be done if it is not necessary, or not proper, to run a specific alternate fault handler to perform certain fix-ups for the exempted exceptions. Exempting certain exceptions may avoid frequent changes to the LSFAR 104 during a microcode routine. However, it is contemplated that most LS exceptions would be handled according to the address stored in LSFAR 104. Also, in some embodiments, the necessary microcode to process the exception may all be included in an alternate fault handler so that it is not necessary to jump to the generic exception processing routine in microcode. Also, an alternate fault handler may specify a particular entry point to the generic exception processing routine.

LSFAR 104 may be mapped into the processor's regular register address space at a particular address. For purposes of examples herein, the LSFAR will be deemed to be mapped at register file address 24 although the particular address is not critical. LSFAR 104 is written by a microcode write to its RF address (24). Typically, LSFAR 104 does not need to be readable. It gets "read" by exception address generator 106 when an exception occurs. In most embodiments there's no need for LSFAR 104 to be instruction readable. Since LSFAR 104 does not need to be read by microcode, no future file entry in future 140 needs to exist for LSFAR 104. However, to alleviate any potential test concerns, LSFAR 104 may be fully readable and writeable, such as on an SRB (special register bus).

LSFAR 104 may be updated at any time by microcode to point to a specific alternate fault handler. As instructions are retired from instruction storage 92 in reorder buffer 32, ROB control unit 94 checks for a write to the LSFAR register address, e.g. register address 24. If such a write exists, control unit 94 loads the result data from that write op into LSFAR 104. In a preferred embodiment, according to the architecture as shown in FIG. 1, each line of instruction storage 92 may include up to three instructions corresponding to the three concurrent execution paths. Accordingly, the microcode may be organized in groups of three instructions referred to as triads. An example of a microcode write to LSFAR 104 with the address of an alternate fault handler is done using a standard register write as shown in the following example.

| # define | LSFAR | tmp24 |
|---|---|---|
| move | LSFAR, $RestoreCPL | ; enable alternative fault handler |
| op | | ; starting with next triad |
| op | | |
| = | | |

The two ops in addition to the LSFAR write are the other two instructions of the triad that contains the LSFAR write. The alternate fault handler specified by the LSFAR write takes effect in the following triad. Any faults occurring in the current triad use the current value of LSFAR 104, i.e. before it is updated by the write in that triad.

Thus, the LSFAR write to enable an alternate fault handler is coded as part of the microcode routine for a particular microcoded instruction in which it is desirable to have an alternate fault handler. It is not necessary to specify a particular alternate fault handler for all microcode routines, although that could be done if desirable. If no alternate fault handler is desired, LSFAR 104 may be left at default value pointing to the generic fault handler. Also, a microcode routine may change alternate fault handlers during execution of the routine by updating LSFAR 104 during the routine. Although not typically desirable, it would be possible for each triad in the routine to specify a different LSFAR value. In a preferred embodiment LSFAR 104 is not updated speculatively. As described above LSFAR 104 is updated only as the LSFAR write is retired in the reorder buffer. By not speculatively updating LSFAR 104 it is not necessary to keep a renamed or backed-up version or versions of LSFAR 104 so that if a speculative path is not taken because of a branch misprediction or exception, for example, there is no need to retrieve the old value of LSFAR 104. Since exceptions are handled at retirement in a preferred embodiment, there is no need to speculatively update LSFAR 104.

The alternate fault handler specified by LSFAR 104 stays in effect until LSFAR 104 is updated. In a preferred embodiment LSFAR 104 is reset to a default value (pointing to the generic fault handler) at the end of a microcode routine. For example, when a microcode exit instruction is retired the current alternate fault handler is "disarmed" and the LSFAR 104 value is reset to a default. In the preferred embodiment there is no need for the microcode to clear LSFAR 104 since exception control unit 96 automatically resets LSFAR 104 to the default value when each microcode routine exits. In a preferred embodiment, aborts do not cause LSFAR 104 to revert to the default handler value. An abort is the action of canceling speculatively executed instructions due to a branch mispredict or an exception. Since LSFAR 104 is not updated speculatively, there is no need to undo the arming of LSFAR because of an abort. However, LSFAR 104 may be reset to its default value by an external reset.

Note also that only one register (LSFAR 104) is needed to specify an alternate fault handler or the default fault handler. Thus, no additional hardware is required to select between an alternate fault handler address and a default fault handler address.

Inside a particular alternate fault handler, the microcode will normally do any clean up, restoring of state, or changing the fault codes as is necessary for the particular context to which the alternate fault handler is directed. An exception may have interrupted a routine and an intermediate state with regards to microcode maintained or hardware maintained state. All or part of the state may need to be restored as it was before the beginning of the routine or before the exception occurred, since, after the exception is handled, execution will typically begin from the point at which the exception occurred. The necessary fix-up or clean-up must typically be performed before microcode enters the generic exception handler and/or passes exception handling off to software. The precise clean-up or fix-up actions taken by a particular alternate fault handler are specific to the microcode routine that was originally interrupted by the exception. There is no need to list all types of clean-ups or fix-ups that may be performed by an alternate fault handler for an understanding of the present invention. However, some partial examples are given as follows.

For Exceptions in String Instructions (MOVS, LODS, STOS, CMPS, SCAS):

update the count register (ECX), or the source pointer (ESI) or the destination pointer (EDI), since these counter and pointers were not maintained in the inner loop of the string microcode.

For exceptions in RETF with a change in privilege level:

restore the old CPL (Current Priv Level), since the CPL was changed to the new value.

For exceptions while copying parameters from user stack to inner stack in CALL far instructions:

restore SS descriptor (since it has already been changed)

restore CPL (since it has already been updated)

change the error codes (fault type) if necessary.

Note that some fix-ups may necessitate writing LS exception reason register 68 with a new value. In order to simplify the hardware and load/store unit 26, an alternate fault handler may write exception reason register 68 with the correct fault code for the context in which the exception occurred. For example, the hardware in load/store unit 26 may be simplified so that a limit violation of any type causes the hardware to place the GP (general protection) code into LS exception reason register 68. However, in certain specific routines where SS (stack register) is used as the base register, the x86 fault code should not be reported as a GP, but as an SF (stack fault) instead. This is a requirement of the x86 architecture. So the alternate fault handler for a routine that uses the SS would read the LS exception reason register 68 and if it contained a GP code, it would replace it with an SF fault code. Thus, the alternate fault handler mechanism allows simplification of the hardware in that specific hardware may be eliminated that otherwise would be necessary to insure that LS exception reason register contained the correct error code for every specific exception context as required by the particular processor architecture.

Figure 6:
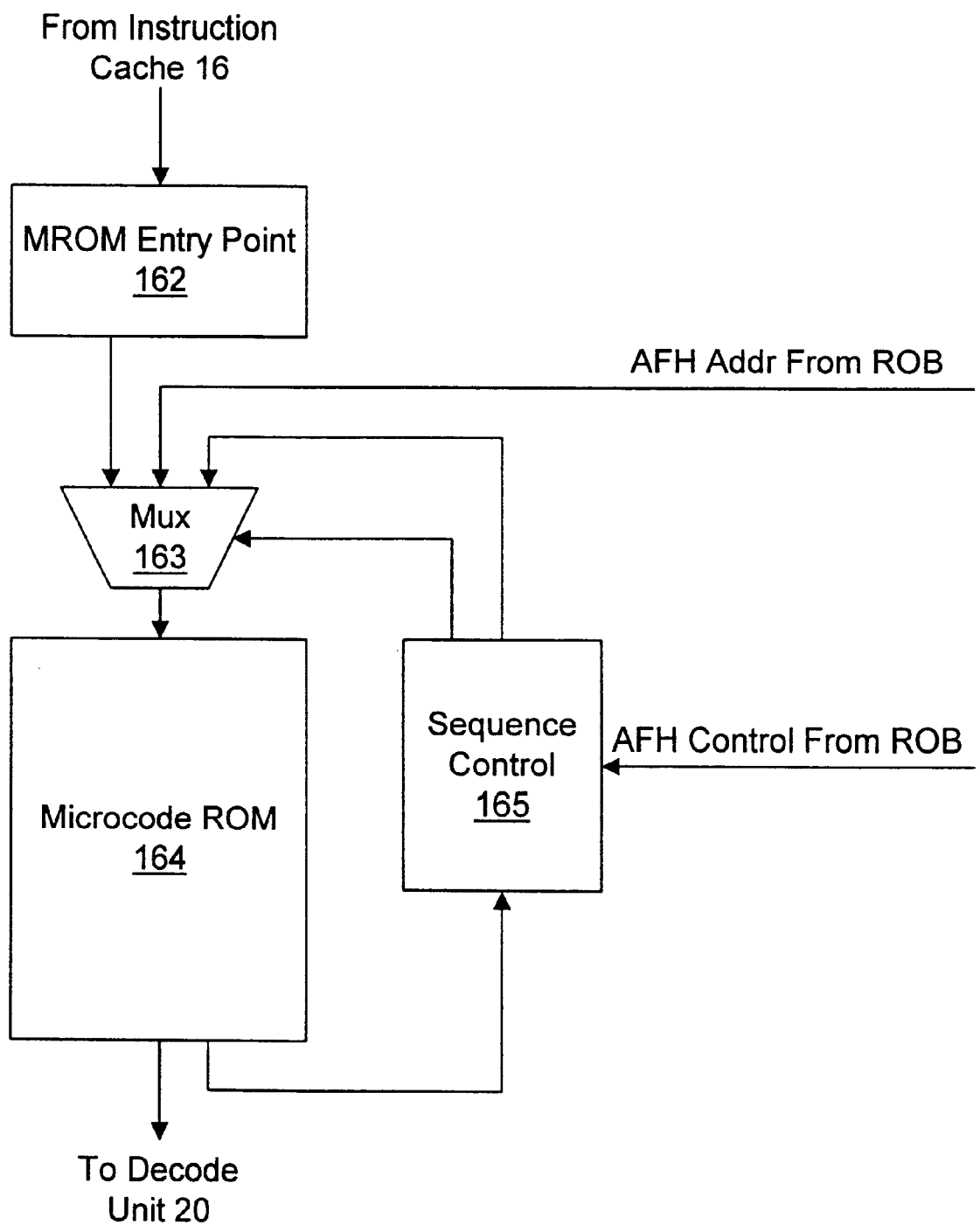
FIG. 6 is a block diagram of one embodiment of an MROM unit.

Turning now to FIG. 6, a simplified diagram depicting portions of MROM unit 34 is shown. Embodiments of microprocessor 10 may employ other elements in addition to those shown in FIG. 6. MROM unit 34 includes MROM entry point unit 162, microcode ROM 164, sequence control unit 165, and mux 163. Instruction cache 16 (FIG. 2) may include an instruction scan unit that detects MROM instructions (instructions that are executed as a microcode routine). MROM instructions detected by the instruction scan unit are conveyed to MROM entry point unit 162. MROM entry point unit 162 calculates the location, or microaddress, of the first microcode instruction in ROM 164 that corresponds to an MROM instruction received from the instruction scan unit. In one embodiment, the microaddress is calculated from the opcode, the MODR/M bytes, and the prefix byte of the MROM instruction. The microaddress calculated by MROM entry point unit 162 is the location of the first microcode line that stores the microcode instructions that effectuate the desired operation of the MROM instruction. Microcode instructions stored in ROM 164, like fastpath instructions, are directly decodeable by the decode unit 20. The number of microcode instructions required to implement an MROM instruction varies from MROM instruction to MROM instruction. Complex MROM instructions may require many microcode instructions, and relatively simple MROM instructions may be implemented by two microcode instructions. In addition to routines to implement MROM instruction, ROM 164 may include other microcode routines necessary for processor operation, such as exception handlers. The microcode instructions that implement an MROM instruction or other routine may include branch instructions.

ROM 164 is a storage device capable of storing microcode instructions. In one embodiment, ROM 164 is a read-only memory (ROM). In other embodiments, other storage devices can be used to implement ROM 164. ROM 164 uses the entry point microaddress from mux 163 to begin a microcode routine. This entry point address may be generated by MROM entry point unit 162 or by exception address generator 106 in the reorder buffer to access the first microcode instruction line of a routine. The microcode address may also come from sequence control unit 165 which controls the address sequence for routines to handle, e.g., braches etc. In one embodiment, ROM 164 stores multiple microcode instructions in each microcode line of ROM 164. In one specific embodiment, each microcode line contains a number of microcode instructions equal to the number of functional units in the microprocessor. Because the number of microcode instructions required to implement an MROM instruction may exceed the number of microcode instructions in one line of ROM 164, sequence control unit 165 determines the location of the next line of microcode to be accessed. The next line of microcode to execute may be the subsequent line in ROM 164. If, however, a microcode line in ROM 164 includes a "taken" branch instruction, sequence control unit 165 detects the branch microaddress and provides that microaddress as the next line to access from ROM 164. Sequence control unit 165 may implement various branch prediction algorithms. Sequence control unit 165 may also control mux 163 and receive indication from exception control unit 96 in the reorder buffer of when an exception has occurred.

In addition to specifying branch addresses, sequence control unit 165 also detects the last line of the microcode sequence and receives indication of exceptions. If a line of microcode in ROM 164 is the last line of microcode to implement an MROM instruction, sequence control unit 165 controls mux 163 to select the entry point of the next MROM instruction, provided by MROM entry point unit 162, as the microaddress of the next line of microcode. If an exception occurs, sequence control unit 165 controls mux 163 to select the entry point of the exception handler, provided by exception address generator 106.

Each line of microcode accessed from ROM 164 is dispatched to decode unit 20. In one embodiment, MROM unit 34 may perform an early decode of each microcode instruction line before dispatching it to decode unit 20. More description of an example of a suitable MROM unit 34 and other aspects of a processor suitable as processor 10 may be found in U.S. patent application Ser. No. 08/873,733 which is hereby incorporated by reference in its entirety.

Figure 7:
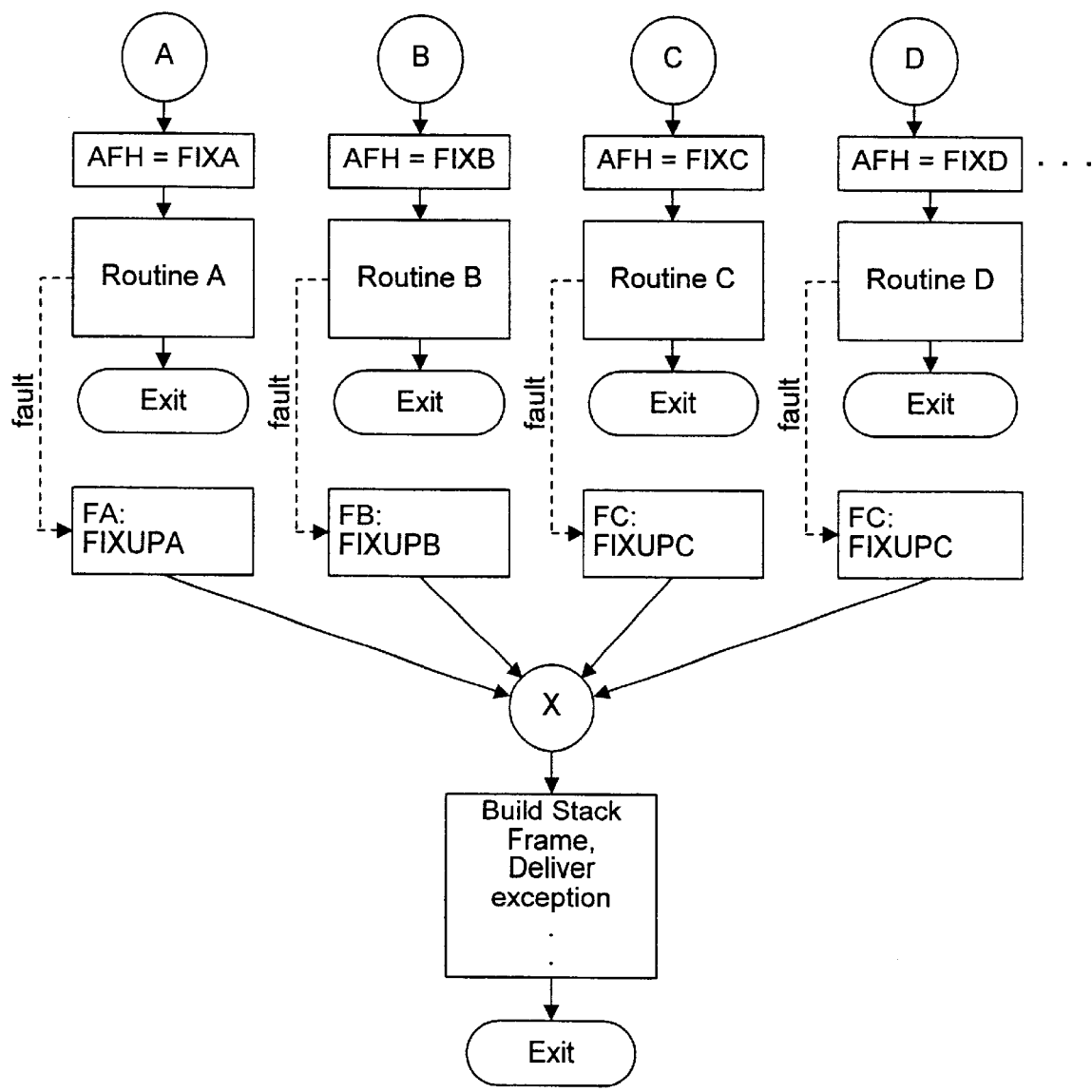
FIG. 7 is a diagram illustrating one embodiment of an alternate fault handler mechanism.

Turning now to FIG. 7, a flow diagram is provided illustrating alternate fault handlers for different microcode routines. FIG. 7 shows different microcode routines A–D. These microcode routines may implement microcoded instructions, for example. Each of the these routines may alter the macro or micro architectural state of the processor. Also as shown in FIG. 7, each routine may be interrupted by an exception or interrupt before it completes. However, before the exception or interrupt occurs during the execution of a specific routine, an alternate fault handler register, such as LSFAR described above, has been programmed with the address of an alternate fault handler specific to the routine or a portion of:the routine. If an exception or interrupt occurs during the routine, then an exception or interrupt handler indicated by the alternate fault handler address register is executed to handle the exception or interrupt. Since the specified alternate fault handler is specific to the context in which the exception or interrupt occurred, the fault handler may perform any necessary clean-up functions before handling the exception or interrupt without having to determine the context in which the exception or interrupt occurred. The clean-up operations handled by the alternate fault handler may include restoring processor state, changing the fault type, or changing error codes, as discussed above. If necessary the alternate fault handler then jumps to a generic or default handler (indicated by X in FIG. 7) to complete the fault handling and pass control to a software handler if necessary.

Thus, as can be seen in FIG. 7, by specifying different alternate fault handlers for different microcode routines, if a fault occurs during one of the routines a fault handler may be executed to immediately perform the necessary clean-up operations without having to first determine the context in which the fault occurred. Since an alternate fault handler is "armed" only for a specific context, if a fault occurs during the time in which that alternate fault handler is armed the correct clean-up operations will be performed for the context in which the fault occurs. This mechanism allows an overall simplification of the microcode since no extra microcode needs to be included to determine the context in which a fault occurs. Also, hardware may be simplified since no special hardware beyond the alternate fault handler address register is required to determine the context in which a fault occurs. Hardware may also be simplified by having the alternate fault handlers perform certain context related clean-up, such as reporting the correct architecturally required fault code to software instead of the hardware determining and setting the exact code.

Figure 8:
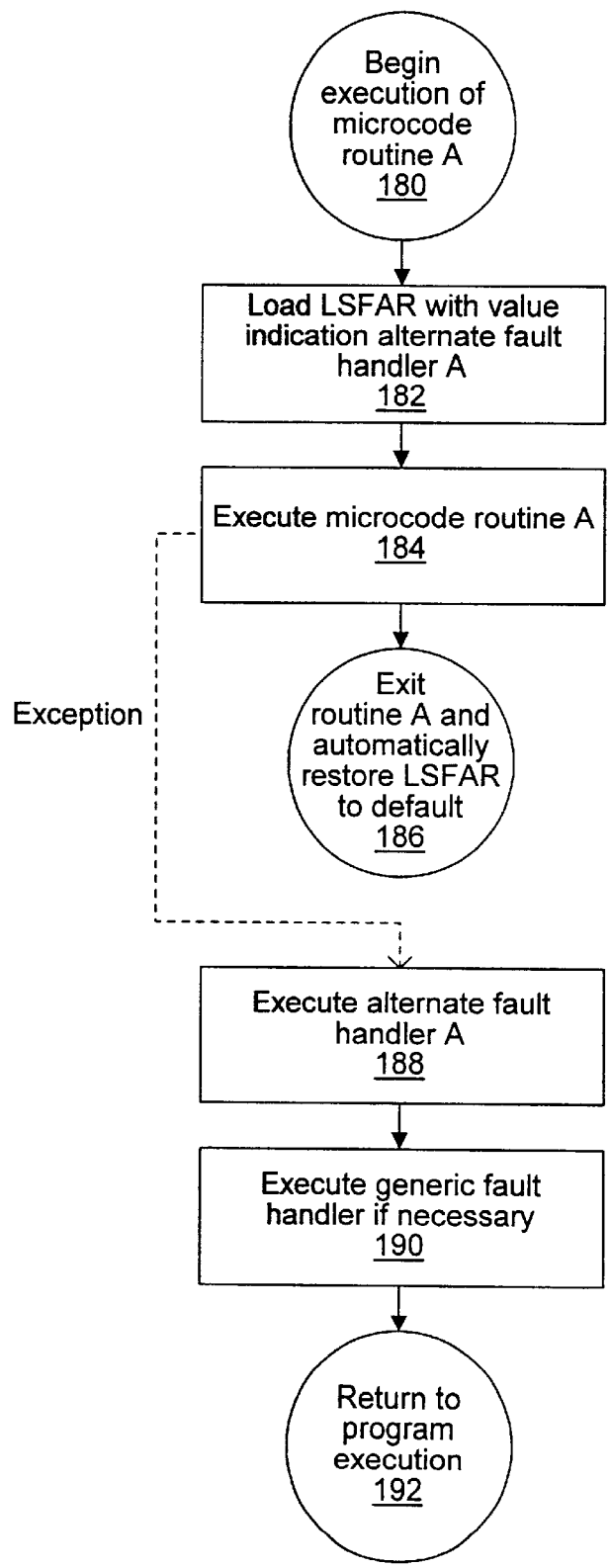
FIG. 8 is a flow diagram illustrating one embodiment of context-related fault handling during execution of a microcode routine.

Turning now to FIG. 8, a more detailed flow diagram is provided illustrating a method of exception handling using alternate fault handlers. At the beginning of a particular microcode routine (180) the LSFAR is loaded with a value indicating a specific alternate fault handler (alternate fault handler A), as indicated at 182. If an exception occurs during the execution of the microcode routine and after the LSFAR has been loaded, as indicated at 184, an alternate fault handler as indicated by the value loaded in LSFAR will be executed to handle the exception, as indicated at 188. If no exception occurs during execution of the routine, the routine completes and exits as normal, as shown at 186. However, when the routine exits, LSFAR is automatically restored to a default value. If an exception does occur and the alternate fault handler indicated by the value in LSFAR is executed, as indicated at 188, then the necessary preliminary exception handling operations (clean-up) are performed and a generic fault handler may then be executed to complete fault handling if necessary, as indicated at 190. From this point fault handling completes as is conventional, as indicated at 192.

Figure 9:
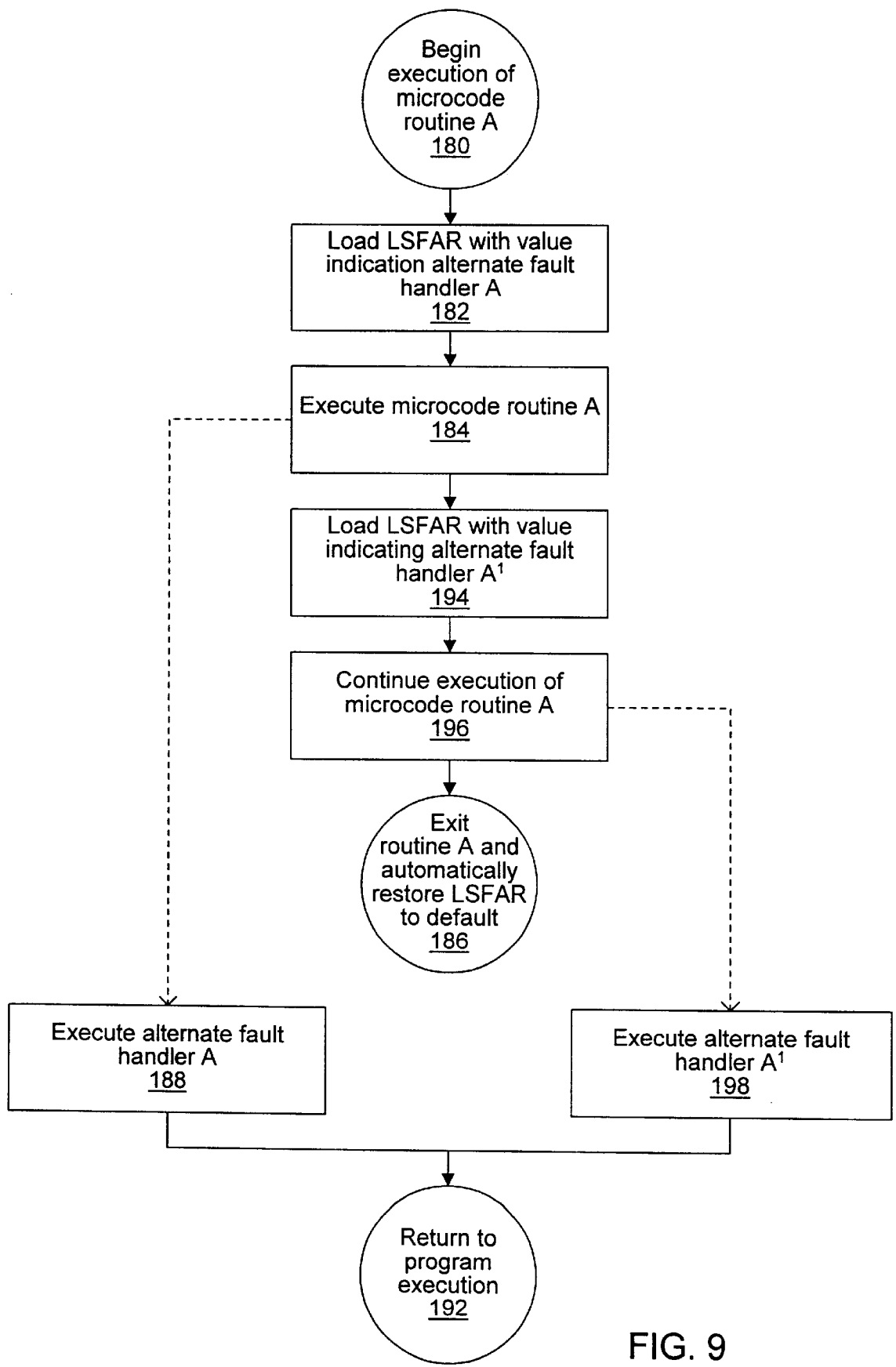
FIG. 9 is a flow diagram illustrating another embodiment of context-related fault handling during execution of a microcode routine.
Figure 10:
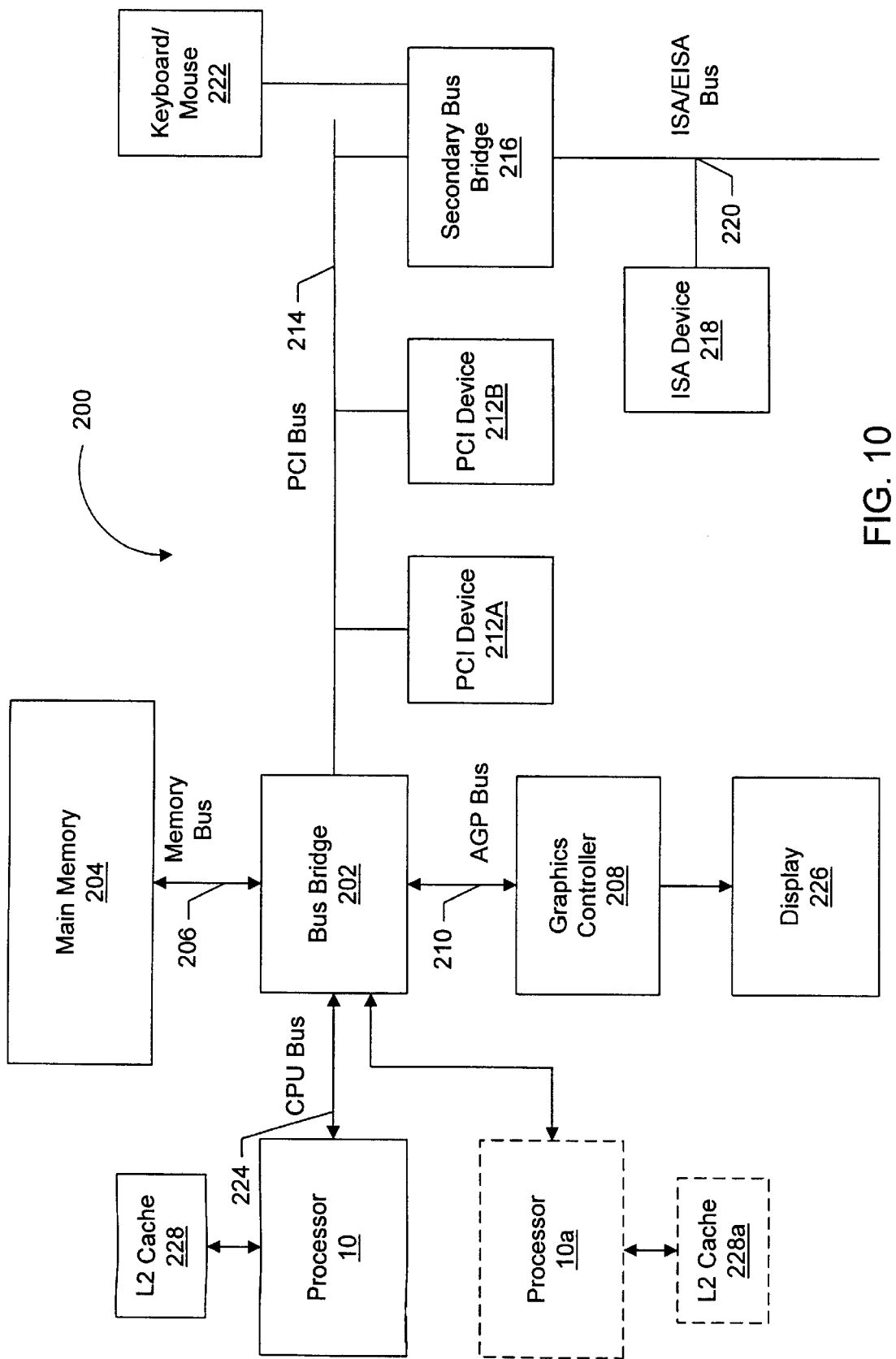
FIG. 10 is a block diagram of one embodiment of a computer system including the processor shown in FIG. 2.

Turning now to FIG. 9, the alternate fault handler operation is again illustrated similar to that shown in FIG. 8. However, FIG. 9 also indicates that the value stored in LSFAR may be changed during the operation of the microcode routine, as indicated at 194. Thus, different alternate fault handlers may be specified during execution of the same microcode routine. The particular alternate fault handler indicated by LSFAR when the exception occurs will be executed as indicated at 188 and 198. As different portions of a microcode routine are completed, different clean-up or fix-up operations may be required if a fault occurs after that point. Thus, it may be desirable to change the value stored in LSFAR at different times during the execution of a microcode routine. LSFAR may be updated as often as desired during the execution of a microcode routine.

Although the fault handling mechanism has been described herein generally in terms of load/store exceptions, it is noted that the mechanism may be applied to any type of exception or interrupt. For example, a processor may include an interrupt fault address register that may be loaded with values that specify different microcode interrupt handling routines depending on the context in which an interrupt is received. Thus, a microcode routine might load both an LSFAR register and an interrupt handler address register (INTHAR) so that if an exception or an interrupt occurs during the execution of that microcode routine, an exception handler or interrupt handler specific to the context of the routine may be executed.

Turning now to FIG. 5, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto semiconductor substrate with processor 10.

Main memory 204 is a memory in which application programs are stored and from which processor 10 primarily executes. A suitable main memory 204 comprises RAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 5) or may share CPU bus 224 with processor 10. Furthermore, processor 10a may be coupled to an optional L2 cache 228a similar to L2 cache 228.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

It is noted that, while a variety of embodiments described above showed comparators coupled to buffers for comparing values within the buffers to input values, these buffers may equivalently be implemented as content addressable memories (CAMs), at least for the portions of the entries being compared, as desired. It is further noted that various embodiments above may be used separately from other embodiments, or may be used in combination with one, or more other embodiments, as desired. Furthermore, an embodiment combining the operation of all the above embodiments is contemplated.

Numerous variations and modifications will become apparent to those skilled in the art once the above disclosure is fully appreciated. It is intended that the following claims be interpreted to embrace all such variations and modifications.

What is claimed is:

1. A processor comprising:
a microcode unit comprising a microcode memory configured to store microcode routines for implementing microcoded instructions and microcode routines for exception handling;
one or more execution units configured to execute the microcode routines;
exception logic configured to indicate if an exception occurs during execution of one of the microcode routines;
a single register configured to store a value indicating the location of an exception handling routine in the microcode memory, wherein if an exception occurs during execution of one of the microcode routines, the exception handling routine indicated by said value is executed; and
wherein said value is changed for different ones of said microcode routines to indicate different exception handling routines; and
wherein said value in said register is returned to a default value upon exiting one of the microcode routines.

2. The processor as recited in claim 1, wherein said one or more execution units are further configured to execute fast path instructions that are not implemented as microcode routines, wherein said value is set to a default value for exceptions that occur during execution of said fast path instructions.

3. The processor as recited in claim 2, wherein said default value indicates the location of a generic exception handling routine.

4. The processor as recited in claim 1, wherein said value is changed by a microcode write to said register, wherein if an exception occurs during the microcode write to said register, the value of said register before the microcode write is used to locate the exception handling routine, and if an exception occurs after the microcode write to said register, the changed value of said register after the microcode write is used to locate the exception handling routine.

5. The processor as recited in claim 1, wherein a plurality of different types of exceptions might occur during execution of one of the microcode routines, wherein for at least one of said types said value is not used to locate the exception handling routine.

6. The processor as recited in claim 1, wherein said register is not read by said microcode routines during normal operation.

7. The processor as recited in claim 1, wherein said value is changed by a microcode write to said register, wherein said microcode write is performed in program order.

8. The processor as recited in claim 7, wherein said register is located in the processor's standard register address space, and wherein said microcode write to said register is a standard microcode register write indicating the address of the register in the processor's register address space.

9. The processor as recited in claim 1, wherein said value is changed by a microcode write to said register, wherein said microcode write is not allowed to be performed speculatively.

10. The processor as recited in claim: 1, wherein said one or more execution units may execute instructions speculatively or out of order, wherein the processor further comprises:
a register file comprising architecturally defined registers of the processor; and
a reorder buffer unit configured to retire instructions in program order so that even if the instructions are executed speculatively or out of order, the register file is updated in program order.

11. The processor as recited in claim 10, wherein said reorder buffer unit comprises an exception control unit, wherein the exception control unit is configured to determine if an exception exists when an instruction is retired by the reorder buffer unit, wherein if an exception exists, the exception control unit reads the value of said register and generates a microcode memory address based on said value, wherein said exception control unit sends said address to said microcode unit to locate an exception handling routine, wherein said register is comprised within said reorder buffer unit.

12. The processor as recited in claim 10, wherein said value in said register is reset to a default value when the processor is reset, but wherein the said value is maintained in its current state when speculative instructions are canceled in said reorder buffer.

13. The processor as recited in claim 1, wherein the exception handling routine indicated by said value is configured to perform preliminary exception handling operations specific to the microcode routine that caused the exception.

14. The processor as recited in claim 13, wherein said preliminary exception handling routines includes completely or partially restoring the processor state to a previous state.

15. The processor as recited in claim 13 further comprising an exception reason register for indicating an exception type when an exception occurs, wherein said preliminary exception handling operations includes changing a value in said exception reason register.

16. The processor as recited in claim 13, wherein after performing said preliminary exception handling operations, the exception handler indicated by said value is configured to jump to a generic exception handling routine.

17. The processor as recited in claim 1, wherein said value in said register is automatically returned to a default value upon exiting one of the microcode routines so that a microcode write is not required to return said value to the default value upon exiting from one of the microcode routines.

18. A method for handling exceptions or interrupts in a processor, comprising:

writing a register in the processor with a first value indicating a first exception or interrupt handling routine;

the processor generating a first exception or receiving a first interrupt while said register stores said first value;

in response to said generating a first exception or receiving a first interrupt, the processor executing said first exception or interrupt handling routine indicated by said first value;

writing said register with a second value indicating a second exception or interrupt handling routine;

the processor generating a second exception or receiving a second interrupt while said register stores said second value;

in response to said generating a second exception or receiving a second interrupt, the processor executing said second exception or interrupt handling routine indicated by said second value; and resetting said register to a default value indicating a generic exception or interrupt handling routine;

wherein said first exception or interrupt handling routine performs exception or interrupt handling operations specific to the processor context in which said first exception or interrupt occurred, and said second exception or interrupt handling routine performs exception or interrupt handling operations specific to the processor context in which said second exception or interrupt occurred.

19. The method as recited in claim 18, wherein said writing a register in the processor with a first value is performed during execution of a first microcode routine in the processor, wherein said first exception or interrupt handling routine is an exception handling routine, and wherein said generating a first exception occurs during execution of said first microcode routine.

20. The method as recited in claim 19, wherein said writing said register with a second value is performed during execution of a second microcode routine in the processor, wherein said second exception or interrupt handling routine is an exception handling routine, and wherein said generating a second exception occurs during execution of said second microcode routine.

21. The method as recited in claim 19, wherein said writing said register with a second value is performed during execution of said first microcode routine in the processor, wherein said second exception or interrupt handling routine is an exception handling routine, and wherein said generating a second exception occurs during execution of said first microcode routine.

22. The method as recited in claim 19, wherein said resetting said register to a default value is performed upon exiting said first microcode routine.

23. The method as recited in claim 22, wherein said resetting said register to a default value is performed automatically upon exiting said first microcode routine so that said first microcode routine does not need to perform a write to said register to restore said register to said default value.

24. The method as recited in claim 19, further comprising resetting said register to said default value upon exiting every microcode routine executed in the processor.

25. The method as recited in claim 18, wherein said first exception or interrupt handling routine, said second exception or interrupt handling routine, and said generic exception or interrupt handling routine are microcode routines stored in a microcode memory in the processor.

26. The method as recited in claim 25 further comprising executing said generic exception or interrupt handling routine after said executing said first or said second exception or interrupt handling routine.

27. The method as recited in claim 18,: wherein said exception or interrupt handling operations performed by said first and second exception or interrupt handling routines include completely or partially restoring the processor state to a previous state.

28. The method as recited in claim 18, wherein said exception or interrupt handling operations performed by said first and second exception or interrupt handling routines include changing a value in an exception or interrupt reason register that indicates information about the exception or interrupt that occurred.

29. The method as recited in claim 18, wherein the processor performs speculative execution of instructions, but said register is not written speculatively.

30. The method as recited in claim 29, wherein said first exception or interrupt is an exception, and wherein said second exception or interrupt is another exception, wherein said first exception and said second exception are generated in program order even if the instructions that caused said first and second instructions were executed speculatively.

31. The method as recited in claim 29, wherein said register is reset to a default value when the processor receives an interrupt, but not when speculatively executed instructions are cancelled.

32. The method as recited in claim 18, wherein said first exception or interrupt is a load/store exception, and wherein said second exception or interrupt is another load/store exception.

33. The method as recited in claim 18, wherein said register is located in the processor's standard register address space, and wherein writing said register is performed as a standard microcode register write indicating the address of said register in the processor's register address space.

34. A processor comprising:

a register configured to store different values, wherein each different value indicates the location of a different condition handling routine;

one or more execution units configured to execute program instructions; and logic configured to receive a condition during execution of the program instructions, wherein said logic is configured to cause execution of the program instructions to be interrupted and the condition handling routine indicated by the value stored in said register to be executed to handle said condition when said condition is received, wherein only said register is used to indicate different condition handling routines for a particular set of conditions.

35. The processor as recited in claim 34, wherein the value stored in said register is chosen so that if said condition occurs, the value will indicate one of the condition handling routines that will perform a condition handling operation specific to the context in which the condition occurred.

36. The processor as recited in claim 34, wherein the condition is a load/store exception.

37. The processor as recited in claim 35, further comprising a microcode memory that stores routines to implement some of said program instructions, wherein said register is written with one of said values during execution of one of the routines to implement a program instruction.

38. The processor as recited in claim 3,7, wherein the condition handling routines are stored in said microcode memory.

39. The processor as recited in claim 37, wherein the register is automatically restored to a default value upon exiting microcode routines.

40. The processor as recited in claim 37, wherein the condition handling routines perform preliminary condition handling operations including completely or partially restoring the processor state to a previous state or changing a condition code to be supplied to a software handler.

41. The processor as recited in claim 37, wherein each condition handling routine is configured to perform preliminary condition handling operations specific to the processor context in which the load/store exception occurs.

42. The processor as recited in claim 41, wherein each condition handling routine is configured to jump to a generic exception handling routine upon completion of said preliminary operations.

43. The processor as recited in claim 34, wherein said register is located in the processor's standard register address space, and wherein writing said register is performed as a standard microcode register write indicating the address of said register in the processor's register address space.

44. A method for context-related exception handling in a processor, comprising:

during execution of a microcode routine, loading an exception handler address register with an address of an exception handling routine;

receiving an exception after said loading and during said execution;

in response to said receiving an exception, redirecting a microcode unit to issue microcode instructions for executing the exception handling routine located in a microcode memory at a microcode memory address indicated by the address in said exception handler address register;

loading different addresses in said exception handler address register during said execution or during execution of other microcode routines, wherein the address loaded indicates the microcode address of an exception handling routine stored in said microcode memory specific to the processor context while that address is stored in said exception handler address register; and restoring said exception handler address register to an address of a default exception handling routine in the microcode memory.

45. The method as recited in claim 44, wherein said restoring is performed automatically upon exiting microcode routines.

46. The method as recited in claim 44, wherein loading said exception handler address register is performed as a standard microcode write indicating the address of said register in the processor's register address space.

* * * * *

UNITED STATES PATENT AND TRADEMARK OFFICE
CERTIFICATE OF CORRECTION

| | | |
|---|---|---|
| PATENT NO. | : 6,442,707 B1 | |
| DATED | : August 27, 2002 | |
| INVENTOR(S) | : Kevin J. McGrath, Michael T. Clark and Scott A. White | |

It is certified that error appears in the above-identified patent and that said Letters Patent is hereby corrected as shown below:

<u>Column 29,</u>
Line 25, please delete "3,7" and insert -- 37 -- therein.

Signed and Sealed this

Fourth Day of February, 2003

JAMES E. ROGAN
*Director of the United States Patent and Trademark Office*